United States Patent
Gurney et al.

(10) Patent No.: US 11,882,081 B2
(45) Date of Patent: Jan. 23, 2024

(54) INTELLIGENT INTERFERENCE MITIGATION FOR TIME DIVISION DUPLEXING BROADBAND NETWORKS

(71) Applicant: MOTOROLA SOLUTIONS, INC., Chicago, IL (US)

(72) Inventors: David P. Gurney, Carpentersville, IL (US); Thomas B. Bohn, McHenry, IL (US); Bradley M. Hiben, Glen Ellyn, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 118 days.

(21) Appl. No.: 17/449,563

(22) Filed: Sep. 30, 2021

(65) Prior Publication Data

US 2023/0095424 A1    Mar. 30, 2023

(51) Int. Cl.
*H04L 5/14* (2006.01)
*H04L 25/02* (2006.01)
*H04W 24/08* (2009.01)

(52) U.S. Cl.
CPC .......... *H04L 5/14* (2013.01); *H04L 25/0202* (2013.01); *H04W 24/08* (2013.01)

(58) Field of Classification Search
CPC ....................................................... H04L 5/14
See application file for complete search history.

(56) References Cited

U.S. PATENT DOCUMENTS

| 8,908,571 B2 | 12/2014 | Hart et al. |
| 9,893,850 B2 | 2/2018 | Ouyang et al. |
| 2011/0081865 A1 | 4/2011 | Xiao et al. |
| 2012/0082070 A1* | 4/2012 | Hart ............... H04J 11/0023 370/280 |
| 2013/0044704 A1 | 2/2013 | Pang et al. |
| 2015/0016411 A1 | 1/2015 | Xiao et al. |

(Continued)

OTHER PUBLICATIONS

Kim, et al. "Dynamic TDD Systems for 5G and Beyond: A Survey of Cross-Link Interference Mitigation," IEEE Communications Surveys & Tutorials, IEEE, vol. 22, No. 4, dated Jul. 13, 2020 (pp. 2315-2348).

(Continued)

*Primary Examiner* — Abdeltif Ajid
(74) *Attorney, Agent, or Firm* — Michael Best & Friedrich LLP

(57) ABSTRACT

Systems and methods for intelligent interference mitigation for time division multiplexing broadband networks. One example embodiments of a wireless base station includes an electronic processor and a transceiver coupled to the electronic processor. The electronic processor is configured to operate to communicate wirelessly via the transceiver with subscriber units utilizing time division duplexing (TDD) and a first frame configuration, and characterize each of a plurality of sub-frames of the first frame configuration as being either conflicting or non-conflicting. The electronic processor is configured to estimate link conditions for the subscriber units and determine, based on the link conditions, whether the subscriber units are resilient or non-resilient. The electronic processor is configured to assign resilient subscriber units to conflicting sub-frames and non-resilient subscriber units to non-conflicting sub-frames.

23 Claims, 5 Drawing Sheets

(56) References Cited

U.S. PATENT DOCUMENTS

2019/0200363 A1* 6/2019 Rajendran ............. H04W 52/16
2019/0215097 A1* 7/2019 Wang .................... H04L 1/0026
2021/0266778 A1* 8/2021 Cao ....................... H04W 76/11

OTHER PUBLICATIONS

International Search Report and Written Opinion for Related Application No. PCT/US2022/076489 dated Dec. 22, 2022 (19 pages).

* cited by examiner

US 11,882,081 B2

INTELLIGENT INTERFERENCE MITIGATION FOR TIME DIVISION DUPLEXING BROADBAND NETWORKS

BACKGROUND OF THE INVENTION

Increased deployment of broadband networks can strain limited radio frequency spectrum resources. To ease this strain, some portions of the radio frequency spectrum reserved for wireless communications are shared among system operators. For example, many wireless broadband networks operate according to the Citizens Broadband Radio Service (CBRS) standards developed by the OnGo Alliance and the Wireless Innovation Forum (WInnForum) to utilize shared spectrum in the 3.5 GHz band. The CBRS band provides 150 MHz of broadband spectrum for use by both public and private system deployments, for example, cellular carriers, cable system operators, wireless internet service providers, and private broadband network providers. These entities must all coexist within the same block of CBRS spectrum.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
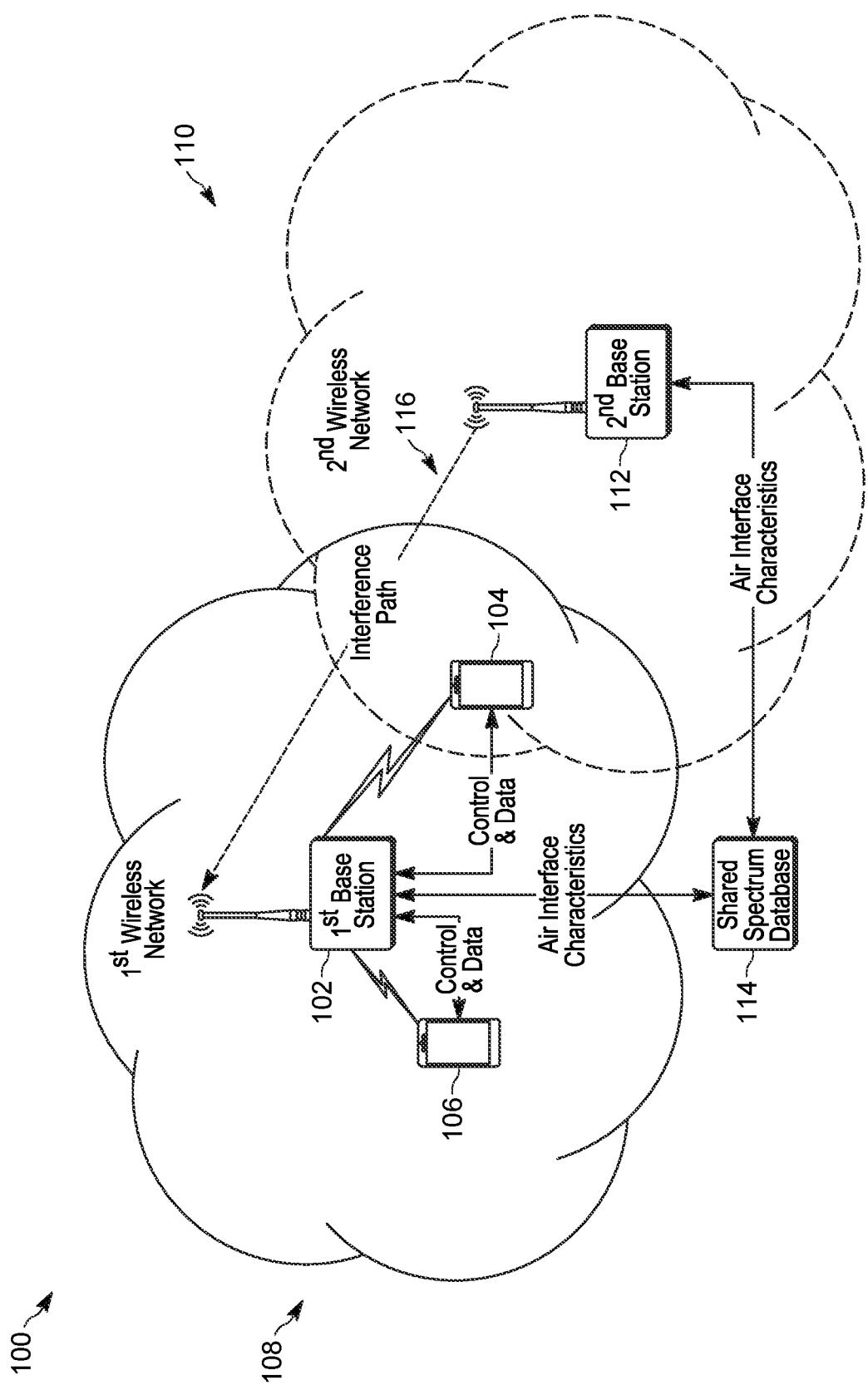
FIG. 1 illustrates a communications system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

In some instances, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Increasingly, broadband networks are deployed using portions of the radio frequency spectrum reserved for wireless communications that are shared among system operators. Many wireless broadband networks operate according to the Citizens Broadband Radio Service (CBRS) standards developed by standards bodies to utilize shared spectrum in the 3.5 GHz band.

Dynamic shared spectrum bands such as the CBRS band will support multiple small cell systems within the same geographic areas. Many of these systems operate using frame synchronized Time Division Duplexing (TDD) technologies. However, due to varying user applications needs, they will necessarily differ in the required TDD-LTE frame configurations (which determine the uplink and downlink subframes on a channel). For example, an industrial IoT system in a factory or a security system on a campus may require an uplink-heavy TDD-LTE frame configuration to support large amounts of uplink (inbound) data traffic from many remote sensors or video cameras. In another example, a commercial cellular system may require a downlink heavy frame configuration to accommodate mobile internet browsing sessions, video downloads, and the like.

When more than one wireless system operates in the same geographic area using the same shared or adjacent frequencies, interference may result. For example, when an uplink-heavy system is operating near a downlink-heavy system, it is possible that the base stations of the uplink-heavy system, while trying to receive signals from its subscriber units, will be interfered with by the base station of the downlink-heavy system as it transmits to its subscriber units. An uplink-heavy/downlink-heavy scenario is not necessary for interference to occur. During any time slot when one system's base station is transmitting on a frequency another system's base station is listening on the same frequency or a sufficiently close frequency, the potential exists for interference to occur. Utilizing differing TDD frame configurations in neighboring wireless systems can lead to both co-channel and adjacent channel interference, which reduces the throughput of the systems.

To address this problem, some have proposed forcing a single TDD-LTE frame configuration on all users of the band. However, this approach to addressing the problem of TDD-LTE coexistence is impractical and too restrictive. For example, this approach would limit the use cases in the band. If a higher uplink frame configuration were mandated, users requiring higher downlink throughput would be unable to effectively use the band. Similarly, if a downlink heavy frame configuration were mandated, users requiring heavier uplink or more balanced uplink and downlink applications would be unable to effectively use the band. This approach is unrealistic in practical deployments when multiple network operators are present with differing applications and goals (as in the examples above).

Additionally, techniques like enhanced inter-cell interference coordination (eICIC) and almost blank subframes (ABS) have been developed in the past to improve data throughput within homogeneous single frequency cellular networks. These techniques can be effectively deployed when there is a single network operator that utilizes a given channel or band, and the operator can tightly control various system operating parameters (including but not limited to TDD frame configuration, time and frequency divisions). However, using these techniques in multi-operator heterogeneous networks deployed in shared spectrum is not possible due to the differing application needs of the networks.

Differing TDD frame configurations in a shared spectrum environment can lead to cross-system interference, which reduces system throughput. The techniques described above, while reducing interference, may themselves reduce system throughput. However, the broadband applications that utilize such systems require sufficient throughput to operate effectively. Among other things, a method is needed to mitigate interference effects and the impact from mis-aligned TDD frame configurations to maintain system throughput when shared spectrum is used.

To address these problems and for other reasons, systems and methods are provided herein for intelligent interference mitigation in TDD broadband networks. Among other things, embodiments described herein provide time and interference aware scheduling of subscriber unit communications. Using such embodiments, a base station that knows there is another nearby base station with a differing TDD frame configuration can determine the specific subframes that are in conflict with the nearby base station. The base station evaluates its subscriber units to determine which of them are most likely to tolerate or overcome the potentially interfering radio signals from another network's base station based on, for example, how close they are to the base station, path loss estimates or power headroom reports. Using such embodiments, the base station can choose to schedule only subscriber units that are, for example, relatively close to the desired base station (e.g., have low path loss) on the conflicting subframes. Other subscriber units are given priority scheduling on subframes that are non-conflicting. Thus all subscriber units transmit when they are most likely to be successfully received at their base station. Using such embodiments, the effect of interference is reduced and network throughput is increased. This, in turn, leads to a more efficient and effective use of the network and computing resources using the network, and those of the network itself.

One example embodiment provides wireless base station. The wireless base station includes an electronic processor and a transceiver coupled to the electronic processor. The electronic processor is configured to operate to communicate wirelessly via the transceiver with a subscriber unit utilizing time division duplexing (TDD) and a first frame configuration. The electronic processor is configured to, for each of a plurality of sub-frames of the first frame configuration, characterize the sub-frame as being one of a conflicting sub-frame and a non-conflicting sub-frame. The electronic processor is configured to estimate a link condition for the subscriber unit. The electronic processor is configured to determine, based on the link condition, whether the subscriber unit is a resilient user or a non-resilient user. The electronic processor is configured to, responsive to determining that the subscriber unit is a resilient user, assign the subscriber unit to those of the plurality of sub-frames that are conflicting sub-frames. The electronic processor is configured to, responsive to determining that the subscriber unit is a non-resilient user, assign the subscriber unit to those sub-frames of the plurality of sub-frames that are non-conflicting sub-frames.

Another example embodiment provides a method for operating a communications network. The method includes operating a first wireless base station to communicate wirelessly with a subscriber unit utilizing time division duplexing (TDD) and a first frame configuration. The method includes, for each of a plurality of sub-frames of the first frame configuration, characterizing, with an electronic processor, the sub-frame as being one of a conflicting sub-frame and a non-conflicting sub-frame. The method includes estimating, with the electronic processor, a link condition for the subscriber unit. The method includes determining, with the electronic processor, based on the link condition, whether the subscriber unit is a resilient user or a non-resilient user. The method includes, responsive to determining that the subscriber unit is a resilient user, assigning the subscriber unit to those of the plurality of sub-frames that are conflicting sub-frames.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should be understood that although certain figures presented herein illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 is a diagram of one example embodiment of a communication system 100, which is configured to, among other things, intelligently mitigate interference in time division duplexing broadband operations. In the example illustrated, the system 100 includes a first base station 102, a subscriber unit 104, and a subscriber unit 106. The first base station 102, described more particularly with respect to FIG. 2, is a wireless base station for operating a first wireless network 108 to provide broadband and other wireless communications to, from, and between the subscriber units 104, 106, described more particularly with respect to FIG. 3.

Figure 2:
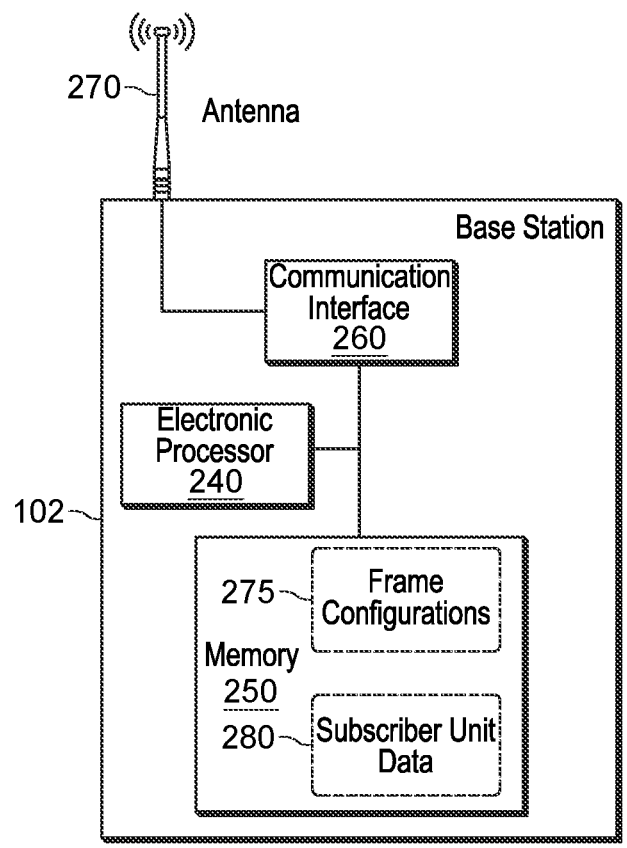
FIG. 2 is a diagram of a base station of the system of FIG. 1 in accordance with some embodiments.

FIG. 2 schematically illustrates an example first base station 102 in more detail. In the embodiment illustrated, the first base station 102 includes an electronic processor 240, a memory 250, a communication interface 260, and an antenna 270. The illustrated components, along with other various modules and components are coupled to each other by or through one or more control or data buses that enable communication therebetween.

The electronic processor 240 may include one or more microprocessors, an application-specific integrated circuit (ASIC), or another suitable electronic device. The electronic processor 240 obtains and provides information (for example, from the memory 250 and/or the communication interface 260), and processes the information by executing one or more software instructions or modules, capable of being stored, for example, in a random access memory ("RAM") area of the memory 250, a read only memory ("ROM") of the memory 250, or another non-transitory computer readable medium (not shown). The software can include firmware, one or more applications, program data, filters, rules, one or more program modules, and other executable instructions. In the embodiment illustrated, the memory 250 stores, among other things, frame configurations 275 and subscriber unit data (both described in detail herein).

The electronic processor 240 is configured to retrieve from the memory 250 and execute, among other things, software related to the control processes and methods described herein. For example, the electronic processor 240 executes instructions stored in the memory 250 to implement functionality of the first base station 102. For example, the electronic processor 240 is configured to control the communication interface 260 and the antenna 270 to transmit and receive LTE radio frequency signals to and from the subscriber units 104, 106.

The electronic processor 240 and the communication interface 260 may include various digital and analog components (for example, digital signal processors, high band filters, low band filters, and the like), which for brevity are not described herein and which may be implemented in hardware, software, or a combination of both. In some embodiments, the communication interface 260 includes a combined transmitter-receiver component (for example, a transceiver). In other embodiments, the communication interface 260 includes or may be replaced by separate transmitter and receiver components.

Figure 3:
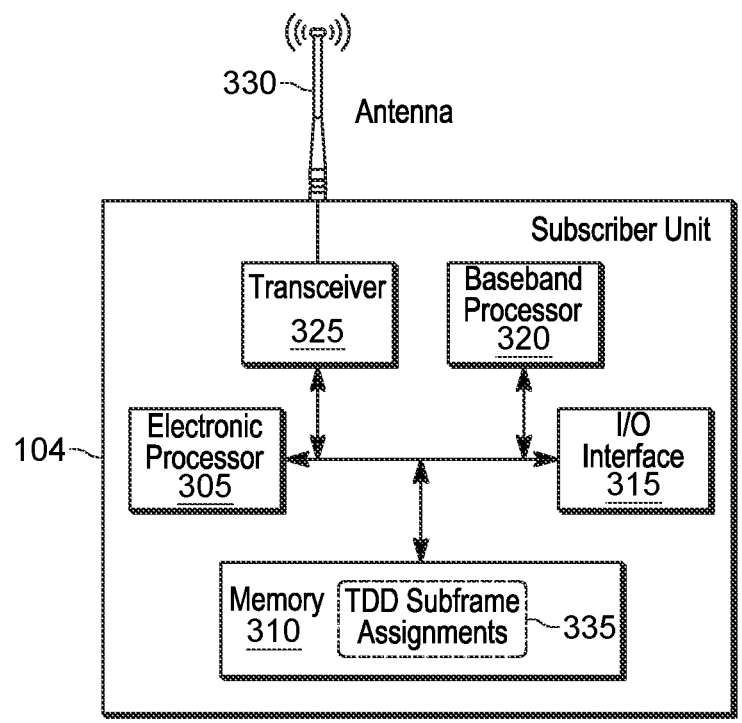
FIG. 3 is a diagram of a subscriber unit of the system of FIG. 1 in accordance with some embodiments.

FIG. 3 schematically illustrates one example embodiment of the subscriber unit 104. In the embodiment illustrated, the subscriber unit 104 includes an electronic processor 305, a memory 310, an input/output interface 315, a baseband processor 320, a transceiver 325, and an antenna 330. The illustrated components, along with other various modules and components are coupled to each other by or through one or more control or data buses that enable communication therebetween. The electronic processor 305 and the memory 310 are similar to those described above with respect to the first base station 102, and perform similar functions. In the embodiment illustrated, the memory 210 stores, among other things, TDD subframe assignments 335 for the subscriber unit 104 (described in detail herein).

The input/output interface 315 is configured to receive input and to provide system output. The input/output interface 315 obtains information and signals from, and provides information and signals to, (for example, over one or more wired and/or wireless connections) devices both internal and external to subscriber unit 104.

The electronic processor 305 is configured to control the baseband processor 320 and the transceiver 325 to transmit and receive LTE radio frequency signals to and from the first base station 102 using the antenna 330. Note that many base stations and subscriber devices typically employ multiple antennas in practice, to realize spatial diversity (e.g., MIMO). The electronic processor 305, the baseband processor 320, and the transceiver 325 may include various digital and analog components (for example, digital signal processors, high band filters, low band filters, and the like), which for brevity are not described herein and which may be implemented in hardware, software, or a combination of both. In some embodiments, the transceiver 325 is a combined transmitter-receiver component. In other embodiments the transceiver 325 includes or may be replaced by separate transmitter and receiver components.

In some embodiments, the subscriber unit 104 includes a human machine interface, which may include a display and suitable physical or virtual selection mechanisms that enable a user to interact with and control the subscriber unit 104.

The subscriber unit 106 includes similar components as described above, and is configured similarly to the subscriber unit 104. In some embodiments, the subscriber units 104, 106, are smart telephones.

Returning to FIG. 1, as noted, the system 100 may include more components than those illustrated. In particular, it should be understood that, although FIG. 1 illustrates only two subscriber units, the system 100 may include an LTE or other wireless network servicing tens, hundreds, or thousands of subscriber units. As illustrated, the first wireless network 108 operates in the same geographic area as a second wireless network 110, which includes a second base station 112. In some embodiments, the first wireless network 108 and the second wireless network 110 operate according to the Long Term Evolution (LTE) (including LTE-Advanced or LTE-Advanced Pro compliant with, for example, the 3GPP TS 36 specification series), or the 5G standard (including a network architecture compliant with, for example, the 3GPP TS 23 specification series and a new radio (NR) air interface compliant with the 3GPP TS 38 specification series), among other possibilities. In such embodiments, each of the first base station 102 and the second base station 112 may be an LTE Evolved Node B (eNodeB). The first base station 102 and the second base station 112 operate to provide wireless communications to and from their respective subscriber units using, among other things, shared spectrum allocated by, for example, a CBRS Spectrum Access System (SAS).

The shared spectrum database 114 is an electronic database, for example, residing on an external database server accessible via one or more network connections. The shared spectrum database 114 may be part of a CBRS Spectrum Access System (SAS) or may be provided separately from a CBRS SAS. In some embodiments, the shared spectrum database 114 includes data related to spectrum assignments to the first and second wireless networks 108, 110 and air interface characteristic data (for example, TDD frame configurations) for the first base station 102 and the second base station 112. As illustrated in FIG. 1, the shared spectrum database 114 is configured to send and receive data, including air interface characteristics, from the first base station 102 and the second base station 112.

Figures 4, 5:
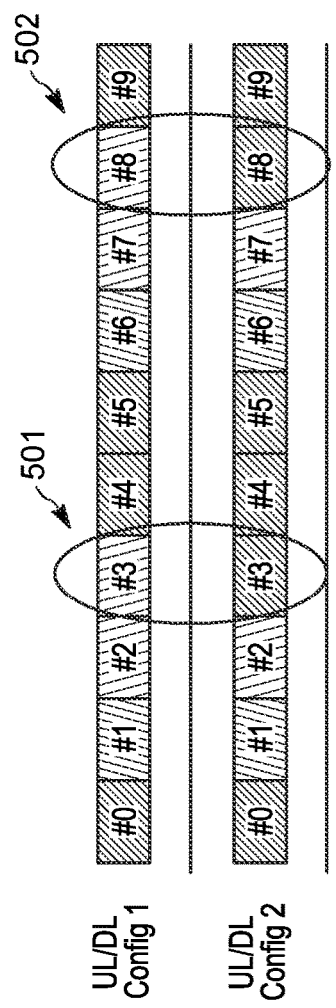
FIG. 4 is a table illustrating time division duplexing patterns for the system of FIG. 1 in accordance with some embodiments.
FIG. 5 is a table illustrating an example of conflicting time division duplexing patterns.

In the illustrated example, the first wireless network 108 and the second wireless network 110 operate in geographic proximity using the same or adjacent channels allocated from a shared spectrum to transmit and receive radio signals using time division duplexing. Using time division duplexing, 3GPP TDD-LTE frame configurations are split into downlink (DL) and uplink (UL) subframes. FIG. 4 illustrates a table 400, which presents a series of 3GPP TDD-LTE frame configurations in terms of the downlink (DL) and uplink (UL) subframe splits. The table 400 illustrates seven TDD frame configurations (0-6), each specifying ten subframes (0-9). As can be seen, there are many differences between the presented TDD frame configurations (ranging from 5 to 10 ms frame repetition, and significantly different ratios of uplink and downlink traffic, generally ranging from a 6:2 to 4:4 to 2:6 DL to UL ratios for 5 ms frame repetition rates in configurations 0, 1 and 2, respectively, and ranging from 8:1 to 3:5 DL to UL ratios for the 10 ms frame repetition rates of configurations 3 through 6). In addition to UL and DL subframes, the frame configurations include subframes having a special subframe format (SSF), which generally contains a large number of DL symbols (for example, 10), a TDD transition/guard time, and a small number of UL symbols (e.g. 2, for commonly utilized SSF format 7). Similar methods as described herein with regard to UL and DL subframes may be applied to SSF subframes.

As illustrated in FIG. 4, there are instances where some frame configurations allow for uplink when other frame configurations allow for downlink during the same subframe, and vice versa. As noted herein, this can lead to interference (for example, the interference path 116 illustrated in FIG. 1).

For example, FIG. 5 illustrates a situation where two TDD-LTE systems share the same channel frequency in a relatively dense area. For example, as illustrated in FIG. 1, where the first wireless network 108 is utilizing TDD frame configuration 1 and the second wireless network 110 is utilizing TDD frame configuration 2. As illustrated in FIG.

5, this results in TDD subframe conflicts 501, 502 between these two systems (which differ in 20% of their subframes). This will cause interference because the second base station 112 is transmitting downlink slots (subframes #3 and #8 of TDD frame configuration 2) while the first base station 102 is receiving uplink slots (subframes #3 and #8 of TDD frame configuration 1). This generally causes interference to the subscriber units 104, 106 transmissions (in uplink/base receive mode) from the downlink transmissions of the second base station 112. As shown in FIG. 5, 50% of base station 102's received slots are subject to interference from base station 112. Other forms of interference, such as mobile uplink to mobile receive in those conflicting slots are also possible.

The downlink to uplink interference (second base station 112 DL to first base station 102 UL) is generally of the most concern because the interfering signal (from the second base station 112) is often strong due to the higher power of base station transmissions (and often due to the higher antenna gains and heights of both the first base station 102 and the second base station 112).

As can be seen in FIG. 4, there are many other combinations of differing frame configurations, which when operated by two or more systems in geographic proximity using shared frequencies could result in interference. As noted, the subframes with the greatest interference potential will typically be those where one base station (for example, the second base station 112, abbreviated BS2) is transmitting DL subframes, and another base station (for example, the first base station 102, abbreviated BS1) is attempting to receive UL subframes at the same time (referred to herein as a "conflicting subframe"). Returning to FIG. 1, the severity of the interference in these subframes will depend on the path loss ($PL_{BS2 \to BS1}$) between the two base stations (the second base station 112 transmitter to the first base station 102 receiver along the interference path 116) and the path loss ($PL_{UE1 \to BS1}$) from the subscriber unit 104 (termed UE1) to the receiving first base station 102, as well as the radiated power differential between the base station transmitter and subscriber unit transmitter (in the direction of the first base station receive antenna, for the given resource allocation).

If all values are expressed in the logarithmic domain (for example, in dB, dBm, and dBi, or similar units), the received power of the desired UE1 (UL) signal at the first base station (BS1) receiver will be:

$$P_{RX\_UE1}(\text{dBm}) = P_{TX\_UE1} + G_{TX\_UE1} - PL_{UE1 \to BS1} + G_{RX\_BS1}$$

where ($P_{TX\_UE1} + G_{TX\_UE1}$) is the effective isotropic radiated power (EIRP) level of subscriber unit 104, and $G_{RX\_BS1}$ is the gain (in dBi) of the receive antenna of the first base station 102 in the direction of the subscriber unit 104. A typical value of $P_{TX\_UE1}$ is 23 dBm and $G_{TX\_UE1}$ typically ranges from 0 to −10 dBi (for various handheld or portable form factors). Power control is also assumed, which attempts to produce a uniform power spectral density target (for example, per resource block) at the base station receiver for all subscriber units in the cell. Note that subscriber units 104, 106 may be transmitting at maximum power levels once they are beyond approximately 50-70% of the cell radius, and their TX power levels also depend on how many resource blocks they are using at the time. Once at maximum subscriber unit transmit power levels, the received signal-to-interference-plus-noise ratio (SINR) can only drop further due to unexpected interference (for example, from the DL transmission from other base station(s) in conflicting subframes).

The received power of the interfering signal from the (DL) transmitter of the second base station 112 at the (UL) receiver of the first base station 102 (in conflicting subframes) will be:

$$P_{RX\_BS2}(\text{dBm}) = P_{TX\_BS2} + G_{TX\_BS2} - PL_{BS2 \to BS1} + G_{RX\_BS1'}$$

where $G_{TX\_BS2}$ is the gain of the transmitting antenna (in dBi) of the second base station 112 in the direction of first base station 102, and $G_{TX\_BS1'}$ is the gain of the transmitting antenna (in dBi) of the first base station 102 in the direction of the second base station 112. Typical values of base station antenna gains $G_{RX\_BS1'}$ and $G_{TX\_BS2}$ range from 6 to 20 dBi. The resulting SINR (in dB) for the subscriber unit 104 uplink signal at the first base station 102 receiver is: $SINR_{RX\_UE1}$ (dB) = $P_{RX\_UE1} - (P_{RX\_BS2} + N)$ where N is equal to the noise power within the resource block allocation of the subscriber unit 104, and $P_{RX\_BS2}$ is effectively the interference power. (The noise term N can typically be ignored in interference limited cases.) This also generally assumes a fully loaded (overlapping) second base station 112 DL signal. It is important to note that $P_{TX\_BS2}$ power level should be adjusted to indicate the equivalent transmit power in the same resource block (RB) allocation as subscriber unit 104 is utilizing (assuming over-lapping resource allocations). Assuming a 10 MHz channel (or a total of 50 RBs in the LTE DL signal), and a typical subscriber unit 104 cell edge resource block allocation of 2 RBs, the required adjustment to the nominal second base station 112 transmit power level would be −14 dB (=10*$\log_{10}$(2/50)) in order to equalize the interference contributions to the same bandwidth. Thus, $P_{TX\_BS2}$ would be 14 dB lower than the full rated transmit power of the base station. For the case of 14 dBi gain base station antennas, the EIRP of the second base station 112 would be equal to $P_{TX\_BS2}$(=BS2 TPO). A typical value for a small cell base station transmit power (TPO) level would be around 30 dBm (1 W).

Assuming typical values as noted above, a 0 dBi subscriber unit antenna (for example, a stubby external antenna), a 16 dBi base station antenna gain in the direction of the subscriber unit and interfering base station, and approximately twice the distance from the first base station 102 to the second base station 112 as the first base station 102 to the subscriber unit 104 (indicating 12 dB of additional loss in the interference path 116 for fourth law propagation in similar terrain & clutter, with roughly similar antenna heights), one arrives at a SINR value of:

$$\text{SINR(dB)} = P_{RX\_UE1} - (P_{RX\_BS2} + N) = (23 \text{ dBm} - PL + 16 \text{ dBi}) - (30 \text{ dBm} + 16 \text{ dBi} - 14 \text{ dB} - (PL + 12 \text{ dB}) + 16 \text{ dBi}) = (39 - PL) - (36 - PL) = 3 \text{ dB}$$

in an interference limited case (where the noise power contribution is negligible). Thus, an approximate SINR of 3 dB is obtained for cell edge subscriber unit 104 during the conflicting DL/UL subframes.

The addition of noise (or interference contributions from other nearby cells) could also further lower this value, as would a lower subscriber unit antenna gain. Therefore, the throughput for cell edge subscriber unit 104 could be significantly degraded (for example, drop by nearly 10 dB during these conflicting subframes compared to typical SINR target values of 12 dB), which could result in approximately a 3-4× reduction in throughput for the subscriber unit 104 (for example, from MCS 22 to MCS 9 using typical LTE receiver performance values, where MCS refers to the modulation and coding scheme being dynamically utilized by the transmitter, which is based on the achievable SINR of the channel. Higher MCS's require higher SINRs.).

It should be noted that a nearby cell edge subscriber unit attached to the second base station 112 could also cause similar or even worse interference if utilizing the same resource blocks on the UL in non-conflicting subframes, though this is unlikely in a fairly persistent CQI-sounded channel with adaptive RB scheduling (as is typical in LTE deployments). The use of ICIC (UL resource splitting) techniques on the UL could also alleviate these UE UL interference concerns in non-conflicting TDD subframes. Note also that antenna downtilt on the base stations could also reduce (DL-UL) interference powers. However, in the conflicting (DL-UL) subframes, there are no techniques currently available to alleviate the DL→UL interference issues described above without significantly negatively affecting throughput levels.

Considering now the subscriber unit 106, which may be ½ the distance to the first base station 102 compared to the subscriber unit 104 (resulting in 12 dB less path loss than the first subscriber unit 104), the throughput degradation for the subscriber unit 106 will typically be much less in conflicting subframes. It can reasonably be assumed that the subscriber unit 106 would have a higher RB allocation (higher baseline throughput) due to the improved SINR on the UL path. Assuming a reasonable 8 RB allocation for the portion of the channel RB allocated to the subscriber unit 106, the adjustment to the second base station 112 interference power becomes 10*log(8/50) or −8 dB. Therefore, the above equation becomes: SINR=(23 dBm−(PL−12 dB)+16 dBi)−(30 dBm+16 dBi−8 dB−(PL+12 dB)+16 dBi)=(51−PL)−(42−PL)=9 dB, again neglecting noise contributions and base station antenna downtilt.

This is a higher SINR than the subscriber unit 104 at cell edge case described above. This may be interpreted as a relatively high SINR (even during the conflicting subframes), and the throughput during these frames would only be somewhat reduced (for example, by 30%, from MCS25 to MCS20) compared to subframes with no DL→UL interference (for example, with a target 12 dB SINR ratio). Still, the throughput reduction would be less pronounced compared to scheduling the subscriber unit 104 in the conflicting subframes, and results in about a 6 dB SINR improvement for those subframes, and a corresponding 2× or more throughput improvement (per utilized resource block). Actual achievable absolute subscriber unit throughput improvements may approach 5-10× considering the increased RB usage that is possible for the closer in subscriber unit 106. Also for nearby subscriber units, additional available subscriber unit power head room (PHR) may be used to further counter-act the ~3 dB nominal SINR reduction (from the target 12 dB SINR). Note that the throughput effects are even more pronounced in both cases for a smartphone form factor subscriber unit with a typical antenna loss of −8 dBi in both cases (resulting in 8 dB lower SINR and PHR values in the examples above), which results in much more pronounced degradation in throughput levels during the conflicting subframes (possibly even causing a service outage for the cell edge subscriber unit 104). Still, the closer-in subscriber unit 106 enjoys a better throughput even in the conflicting subframe cases.

It can be seen that a nearby (co-channel) CBRS base station with conflicting subframes can cause interference that causes an approximate 3-4× (or more) reduction in distant subscriber unit UL throughput levels, and a potential throughput reduction (of a lesser magnitude) for close-in subscriber units in the serving cell. The ill-effects on subscriber unit throughput (due to conflicting TDD DL/UL subframes) drop off when the subscriber unit is closer to the desired base station, as described above. (Also as noted above, when a subscriber unit is near the desired base station, there is also more UL transmit power headroom (PHR) to overcome interference from other cells.) For a given desired throughput level, it may also be possible to schedule the subscriber unit's data traffic in a smaller resource block allocation, which also improves the SINR due to reduced overlap with the interfering base station's DL signal (due to the 10 log effect discussed above). Therefore, the desired base station has more tools available to deal with increased interference for the nearby subscriber units, and throughput will suffer less for subscriber units that are relatively closer to the desired base station. Note that interference from adjacent channel transmissions of a base station with a conflicting TDD frame configuration may also occur, and may be mitigated using similar means as described above.

Figure 6:
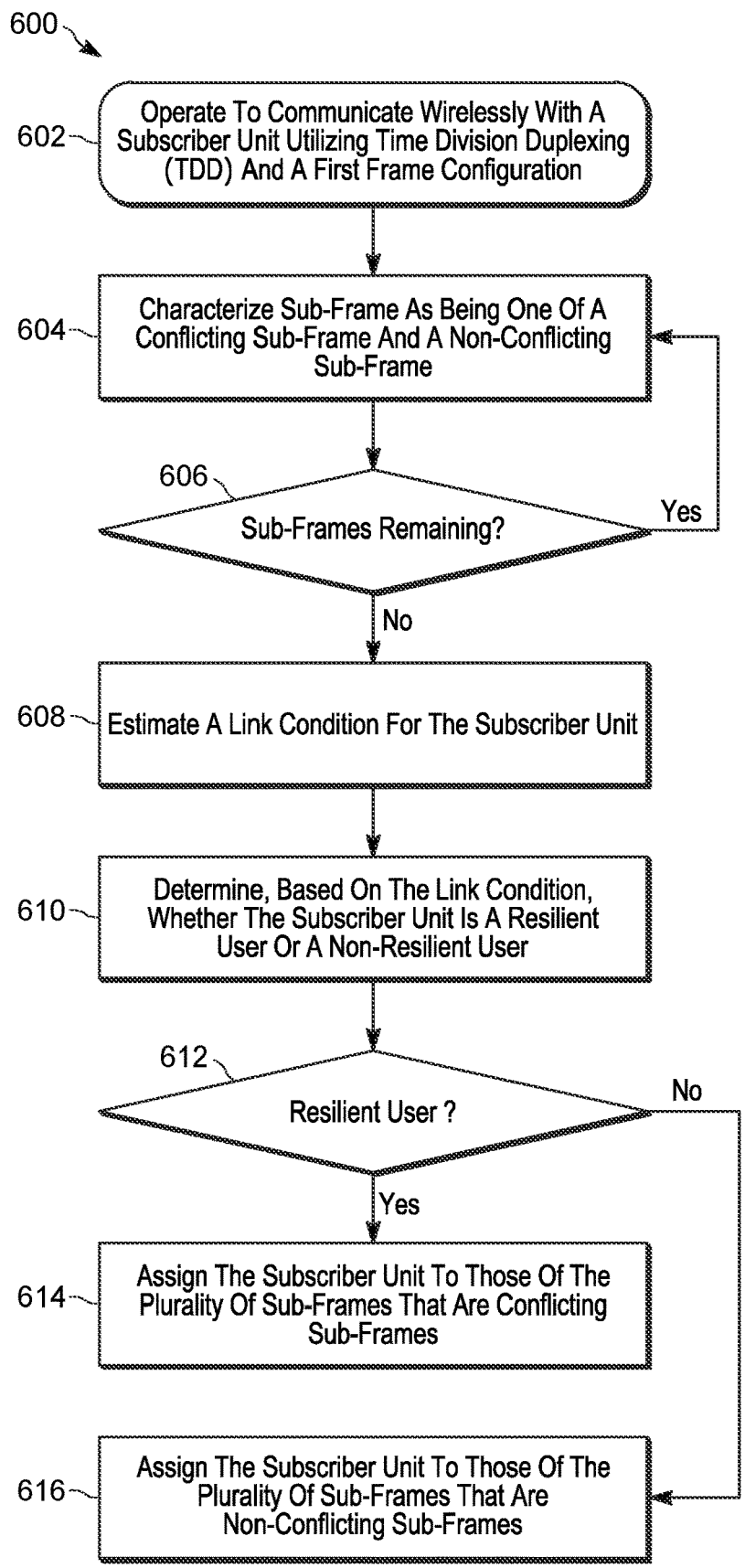
FIG. 6 is a flowchart illustrating a method for intelligent interference mitigation in a time division duplexing broadband network in accordance with some embodiments.

Accordingly, FIG. 6 illustrates an example method 600 for intelligent interference aware scheduling at a desired base station. Although the method 600 is described in conjunction with the system 100 as described herein, the method 600 may be used with other systems and devices. In addition, the method 600 may be modified or performed differently than the specific example provided.

As an example, the method 600 is described as being performed by the first base station 102 and, in particular, the electronic processor 240. However, it should be understood that, in some embodiments, portions of the method 600 may be performed by other devices, including for example, one of the subscriber units 104. Additional electronic processors may also be included in the base station 102 or other control equipment for the wireless network 108 (not shown) that perform all or a portion of the method 600. For ease of description, the method 600 is described in terms of a single base station and a single subscriber unit experiencing potential interference from a one other base station. However, the method 600 may be applied to systems including multiple base stations and subscriber units facing potential interference from multiple other base stations from multiple networks.

The method 600 begins, at block 602, with the electronic processor 240 operating the base station 102 to communicate wirelessly (for example, via a transceiver of the communication interface 260) with a subscriber unit (for example, the subscriber unit 104) utilizing time division duplexing (TDD) and a first frame configuration. For example, the first base station 102 may be operating according to LTE standards using one of the TDD-LTE frame configurations illustrated in FIG. 4.

As noted, each frame configuration includes a plurality of sub-frames. For each of the plurality of sub-frames of the first frame configuration, the electronic processor 240 (at block 604) characterizes the sub-frame as being one of a conflicting sub-frame and a non-conflicting sub-frame. The electronic processor 240 may characterize the sub-frames using one or more of a number of techniques.

In one example, the electronic processor 240 determines a block error rate for the sub-frame. For example, the first base station 102 may determine and track block error rates over time and determine average, rolling average, median or other block error rate values for each sub-frame time slot. In such embodiments, the electronic processor 240 characterizes the sub-frame as being one of a conflicting sub-frame and a non-conflicting sub-frame based on the block error rate. For example, a threshold block error rate may be determined, the meeting or exceeding of which is used to classify the sub-frame as being conflicting. In another example, the block error rates for the sub-frames may be compared to an average value for all sub-frames, with block error rates exceeding the average value being used to classify their sub-frames as conflicting.

In another example, the electronic processor 240 determines a noise plus interference floor and characterizes the sub-frame as being one of a conflicting sub-frame and a non-conflicting sub-frame based on the noise plus interference floor. For example, the first base station 102 may determine and track SINR values over time and determine average, rolling average, median or other SINR values for each sub-frame time slot. The SINR values for the sub-frames may then be compared to the noise plus interference floor to characterize the sub-frame as being one of a conflicting sub-frame and a non-conflicting sub-frame. Alternatively, the noise plus interference floor may be measured directly by occasionally not assigning any subscriber units to transmit in a particular uplink slot and measuring the received power in the unassigned slot. For example, base station 102 may assign neither subscriber unit 104 nor subscriber unit 106 to transmit on a particular slot. Then the power measured in that slot is due to the sum of thermal noise and interference from system 110. The noise plus interference measured this way can be compared to that measured for other slots to determine conflicted slots.

In another example, the electronic processor 240 receives, via a transceiver, a wireless signal from a second wireless base station (for example, the second base station 112). The electronic processor 240 decodes a control channel of the wireless signal (for example, to read the Master Information Block (MIB)/System Information Blocks (SIBs)). The electronic processor 240 determines, from the control channel, a second frame configuration for the second wireless base station. In such embodiments, the electronic processor 240 compares the second frame configuration to the first frame configuration to characterize the plurality of sub-frames into conflicting and non-conflicting sub-frames. As described above with respect to FIG. 4 and FIG. 5, it can be determined which sub-frames conflict by comparing two frame configurations.

In some embodiments, the electronic processor 240 retrieves, from an electronic database, a second frame configuration for a second wireless base station operating in the vicinity of the wireless base station. For example, the electronic processor 240 may query the shared spectrum database 114 for air interface characteristics (including TDD frame configurations and frequencies) for wireless base stations operating within a specified distance of the first base station 102. Using this data, the electronic processor 240 can compare the second frame configuration to the first frame configuration to characterize the plurality of sub-frames into conflicting and non-conflicting sub-frames, as set forth herein.

At block 606, when the electronic processor 240 has characterized all of the sub-frames, it estimates a link condition for the subscriber unit (at block 608). For example, the electronic processor 240 may estimate a link condition for the subscriber unit by determining a path loss or a path loss model, as described above. In another example, the electronic processor 240 may estimate a link condition for the subscriber unit by determining a signal-to-interference-plus-noise ratio, a received signal strength indicator, a reference or sounding symbol power level, and comparing these values to threshold values to assign a link condition value for the subscriber unit (for example, based on how close the determined value is to the threshold value. In another example, the electronic processor 240 may estimate a link condition for the subscriber unit by estimating a location for the subscriber unit. For example, the electronic processor 240 may use the estimated location for the subscriber unit to estimate a link condition based on how close the subscriber unit is to the first base station 102 (for example, with closer units having a higher link condition or being more resilient than farther units). The estimated location of a subscriber unit may be determined via GPS (including assisted GPS), time difference of arrival (TDOA) techniques, or a range of other methods. A variety of propagation models incorporating detailed terrain and clutter (e.g., foliage, buildings, etc.) may be utilized to estimate link conditions such as path loss or SINR values between the affected base stations and subscribers. Additionally, LTE subscribers may provide power headroom reports depending on system conditions or configuration. The report indicates how much transmitter power is left for the subscriber unit to use in addition to the power being used by current transmission. Given the received power measured by the base station receiver, the power headroom report and knowledge of the subscriber unit's maximum transmit power, the path loss of the link can be determined.

The link condition is an indicator of how likely it is that a subscriber unit will be able to tolerate or overcome potentially interfering radio signals from another network's base station. For example, a subscriber unit with a higher received signal strength indicator would be assigned a higher link condition than a subscriber unit with a lower received signal strength indicator. Similarly, a subscriber unit with less path loss would be assigned a higher link condition than a subscriber unit with a higher path loss. In some embodiments, estimated link conditions are represented by a numerical value. For example, each subscriber unit may be assigned a percentage value of between 0 and 100, with 0 being the lowest value and 100 being the highest value.

Regardless of how the link condition is estimated, the electronic processor 240, at block 610 determines, based on the link condition, whether the subscriber unit is a resilient user or a non-resilient user. A resilient user is a subscriber unit that is more likely to overcome interference than a non-resilient user. For example, as described above, the subscriber unit 106 is a resilient user when compared to the subscriber unit 104, which is a non-resilient user. In some embodiments, the estimated link conditions are compared to a threshold value to determine whether the subscriber unit is a resilient user or a non-resilient user. For example, when a subscriber unit's estimated link condition exceeds is 6 or better on a scale of 1 to 10, that unit is classified as resilient. In some embodiments, the estimated link conditions for all subscriber units attached to a base station are compared relative to one another to determine whether subscriber units are resilient users or non-resilient users.

In some embodiments, an alternative or additional means is used to determine whether the subscriber unit is a resilient user or a non-resilient user. In such embodiments, the electronic processor 240 measures a receive interference power level for a time periods for both conflicting and non-conflicting subframes, during which time no subscribers are assigned by the base station. In effect, the base station instructs its subscriber units not to transmit and listens to the noise and interference levels on each subframe. In such embodiments, the electronic processor 240 determine whether the subscriber unit is a resilient user or a non-resilient user based on the receive power interference level and a power headroom report from the subscriber unit. For example, when the electronic processor 240 determines that the subscriber unit has sufficient power headroom to increase its power to overcome the interference (as determined by the measured receive power interference level), that subscriber unit is classified as resilient. This determination may also be based on historical received SINR estimates for each particular subscriber unit. For example, if the SINR estimate for a subscriber unit is low (below some threshold) when it is assigned to a conflicting subframe (i.e., it is a non-resilient user), it may in the future be assigned to a non-conflicting subframe.

Responsive to determining that the subscriber unit is a resilient user (at block 612), the electronic processor 240, at block 614 assigns the subscriber unit to those of the plurality of sub-frames that are conflicting sub-frames. For example, the electronic processor 240 schedules the subscriber unit on a sub-frame by sub-frame basis to transmit only on the conflicting sub-frames. In the event that many or all of the subscriber units are resilient they may be assigned to non-conflicting sub-frames since it does not hurt resilient subscriber devices to use non-conflicted sub-frames.

Alternatively, or in addition, the electronic processor 240, responsive to determining that the subscriber unit is a resilient user, instructs the subscriber unit to operate using adaptive power control. For example, the subscriber unit's adaptive power control increases a power output of the subscriber unit sufficiently to overcome the interference.

Responsive to determining that the subscriber unit is a non-resilient user (at block 612), the electronic processor 240, at block 616, assigns the subscriber unit to those of the plurality of sub-frames that are non-conflicting sub-frames.

In some embodiments, the first base station uses aspects of the method 600 to determine on which channel it will operate. For example, for each of a plurality of radio frequency channels, the electronic processor 240, for each of the plurality of sub-frames of the first frame configuration, characterizes the sub-frame as being one of a conflicting sub-frame and a non-conflicting sub-frame, as described above with respect to block 604. After characterizing the sub-frames for each of the plurality of radio frequency channels, the electronic processor 204 selects, from the plurality of radio frequency channels, an operating channel for the base station, the operating channel having the least amount of conflicted sub-frames of the plurality of radio frequency channels. The selection process may also take into account the severity of the subframe conflicts, with nearby base stations with differing TDD frame configurations causing more severe subframe conflicts than more distant base stations. This may be determined based on estimating the interfering base station (112) distance, path loss estimates, subscriber SINR values, or base station (102) received noise and interference measurements (as described above). In this manner, each of the potential radio frequency channels may be weighted according to the severity of sub-frame conflicts on that channel (e.g., with nearby base stations that cause more subframe interference having a higher weight), and the overall channel with the least sub-frame conflict weight is selected as the operating channel.

Additionally, dynamic electrical antenna downtilt (e.g., in a sectorized or omni antenna) may be incorporated during the conflicting subframes to further improve the received SINR. Electrical downtilt can be accomplished quickly by changing the phasing of antenna elements. This in turn reduces the interfering signal contribution from distant base stations. For example, the electronic processor 240 may, responsive to determining the subscriber unit is a resilient user, control an antenna coupled to the transceiver to electronically adapt a downtilt of the antenna during conflicting sub-frames. In this manner, antenna downtilt is typically increased for those resilient (e.g., nearby) subscribers, reducing the interfering effects from more distant base stations. This method may be used in conjunction with the above described techniques to further reduce conflicting subframe interference.

Figure 7:
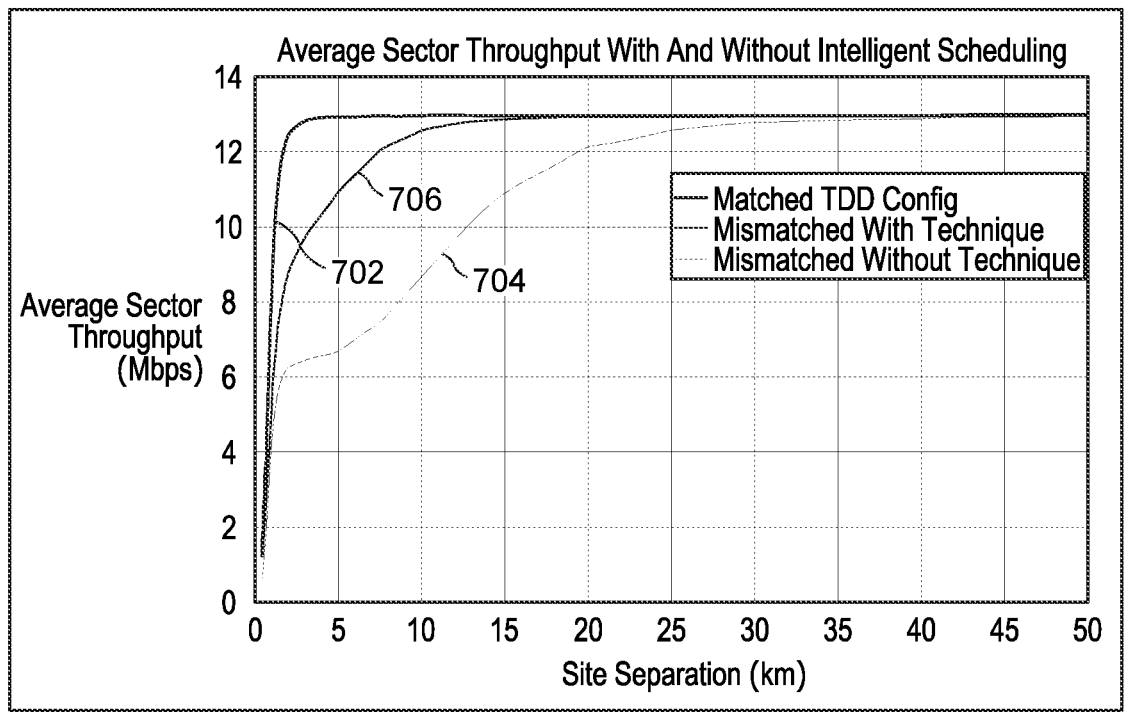
FIG. 7 is a graph illustrating aspects of the operation of the system of FIG. 1 in accordance with some embodiments.

FIG. 7 is a graph 700 illustrating the impact of embodiments described herein on overall system throughput. The x-axis of the graph is the separation of the two base stations, for example, base station 102 and base station 112. The larger the separation between the base stations, the less likely interference is to occur. Line 702 shows average sector throughput for a matched TDD configuration, where all sub-frames are non-conflicting. Line 702 shows that even without conflicting sub-frames there is interference due to the subscriber devices which results in loss of throughput at very close site spacing. If one or more sub-frames are mismatched (conflicting)—for example as illustrated in FIG. 5, throughput is reduced as shown in line 704. When applying methods described herein in a mismatched situation, throughput is increased and more closely approximates the throughput for operations where the TDD configurations are matched, as shown by line 706.

Figure 8:
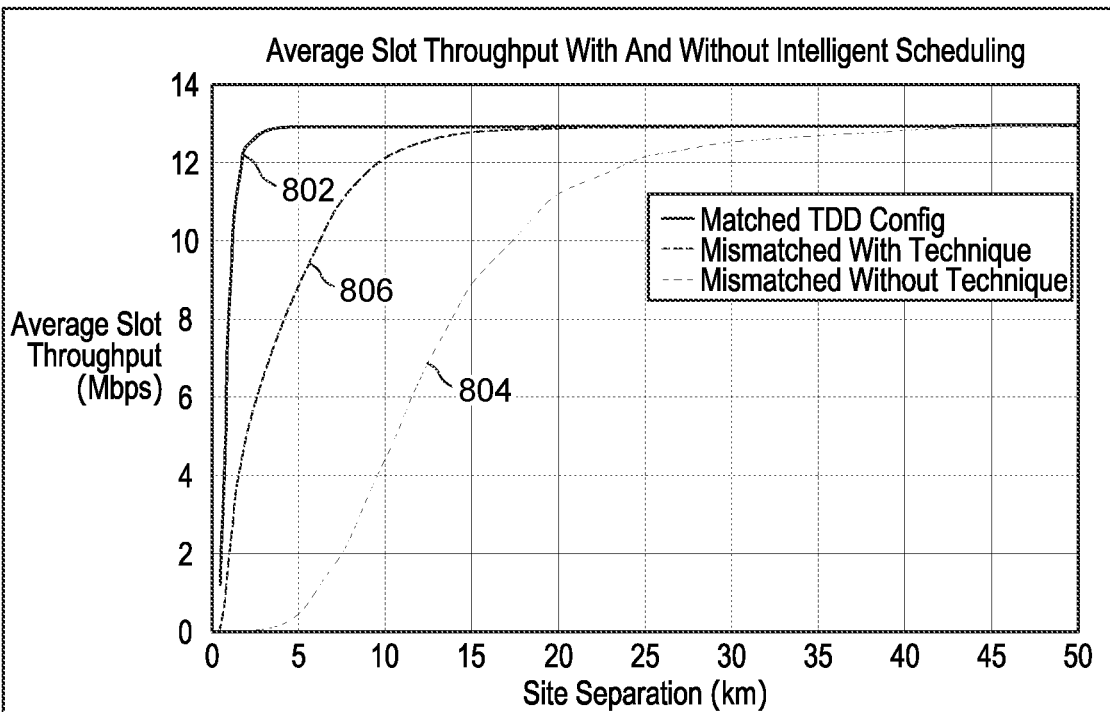
FIG. 8 is a graph illustrating aspects of the operation of the system of FIG. 1 in accordance with some embodiments.

FIG. 8 is a graph 800 illustrating the impact of embodiments described herein on throughput for the interfered sub-frame (slot) alone. Line 802 shows average slot throughput for a matched TDD configuration, where all sub-frames are non-conflicting. If one or more sub-frames are mismatched (conflicting)—for example as illustrated in FIG. 5, throughput is reduced as shown in line 804. When applying methods described herein in a mismatched situation, throughput is increased and more closely approximates the throughput for operations where the TDD configurations are matched, as shown by line 806.

In the examples described above, the serving base station (the first base station 102) was considered. It should be understood that similar techniques may be applied on the misaligned downlink of the other base station (the second base station 112). In this case, subscriber unit 104 could cause significant interference on the DL of the second base station 112 to other nearby subscriber units attached to the second base station 112. Thus, the second base station 112 could only schedule the resilient users (e.g., nearby subscriber units) during the conflicting subframes (in a manner similar to the serving first base station 102 scheduling) in order to minimize interference in those cases.

It should also be understood that these techniques may be applied to any Time Division Duplex (TDD) system or similar modulations that share the channel between uplink and downlink. The techniques can also be applied to non-shared spectrum systems, where heterogeneous frame configurations need to be utilized.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A wireless base station comprising:
an electronic processor; and
a transceiver coupled to the electronic processor;
wherein the electronic processor is configured to:
operate to communicate wirelessly via the transceiver with a subscriber unit utilizing time division duplexing (TDD) and a first frame configuration;
for each of a plurality of sub-frames of the first frame configuration, characterize the sub-frame as being one of a conflicting sub-frame and a non-conflicting sub-frame;
estimate a link condition for the subscriber unit;
determine, based on the link condition, whether the subscriber unit is a resilient user or a non-resilient user;
responsive to determining that the subscriber unit is a resilient user, assign the subscriber unit to those of the plurality of sub-frames that are conflicting sub-frames; and
responsive to determining that the subscriber unit is a non-resilient user, assign the subscriber unit to those of the plurality of sub-frames that are non-conflicting sub-frames.

2. The wireless base station of claim 1, wherein the electronic processor is configured to:
estimate a link condition for the subscriber unit by determining at least one selected from the group consisting of a path loss, a signal-to-interference-plus-noise ratio, a received signal strength indicator, a broadcast reference symbol power level, a location for the subscriber unit, and a path loss model.

3. The wireless base station of claim 1, wherein the electronic processor is configured to:
for each of the plurality of sub-frames of the first frame configuration,
determine a block error rate for the sub-frame; and
characterize the sub-frame as being one of a conflicting sub-frame and a non-conflicting sub-frame based on the block error rate.

4. The wireless base station of claim 1, wherein the electronic processor is configured to:
for each of the plurality of sub-frames of the first frame configuration,
determine a noise plus interference floor; and
characterize the sub-frame as being one of a conflicting sub-frame and a non-conflicting sub-frame based on the noise plus interference floor.

5. The wireless base station of claim 1, wherein the electronic processor is configured to:
receive, via the transceiver, a wireless signal from a second wireless base station;
decode a control channel of the wireless signal;
determine, from the control channel, a second frame configuration for the second wireless base station; and
compare the second frame configuration to the first frame configuration to characterize the plurality of sub-frames into conflicting and non-conflicting sub-frames.

6. The wireless base station of claim 1, wherein the electronic processor is configured to:
retrieve, from an electronic database, a second frame configuration for a second wireless base station operating in the vicinity of the wireless base station; and
compare the second frame configuration to the first frame configuration to characterize the plurality of sub-frames into conflicting and non-conflicting sub-frames.

7. The wireless base station of claim 1, wherein the electronic processor is configured to:
measure a receive interference power level for a time period, and during which time no subscribers are assigned during that time period; and
determine whether the subscriber unit is a resilient user or a non-resilient user based on the receive power interference level and a power headroom report from the subscriber unit.

8. The wireless base station of claim 1, wherein the electronic processor is configured to:
responsive to determining that the subscriber unit is a resilient user, operate the subscriber unit using adaptive power control.

9. The wireless base station of claim 8, wherein the adaptive power control increases a power output of the subscriber unit sufficiently to overcome the interference.

10. The wireless base station of claim 1, wherein the electronic processor is configured to:
for each of a plurality of channels,
for each of the plurality of sub-frames of the first frame configuration, characterize the sub-frame as being one of a conflicting sub-frame and a non-conflicting sub-frame; and
select, from the plurality of channels, an operating channel for the base station, the operating channel having the least amount of conflicted sub-frames of the plurality of channels.

11. The wireless base station of claim 1, further comprising:
an antenna coupled to the transceiver and controllable by the electronic processor;
wherein the electronic processor is configured to:
responsive to determining that the subscriber unit is a resilient user, electronically adapt a downtilt of the antenna during conflicting sub-frames.

12. A method for operating a communications network, the method comprising:
operating a first wireless base station to communicate wirelessly with a subscriber unit utilizing time division duplexing (TDD) and a first frame configuration;
for each of a plurality of sub-frames of the first frame configuration, characterizing, with an electronic processor, the sub-frame as being one of a conflicting sub-frame and a non-conflicting sub-frame;
estimating, with the electronic processor, a link condition for the subscriber unit;
determining, with the electronic processor, based on the link condition, whether the subscriber unit is a resilient user or a non-resilient user; and
responsive to determining that the subscriber unit is a resilient user, assigning the subscriber unit to those of the plurality of sub-frames that are conflicting sub-frames.

13. The method of claim 12, further comprising:
responsive to determining that the subscriber unit is a non-resilient user, assigning the subscriber unit to those of the plurality of sub-frames that are non-conflicting sub-frames.

14. The method of claim 12, wherein estimating a link condition for the subscriber unit includes determining at least one selected from the group consisting of a path loss, a signal-to-interference-plus-noise ratio, a received signal strength indicator, a broadcast reference symbol power level, a location for the subscriber unit, and a path loss model.

15. The method of claim 12, further comprising:
for each of the plurality of sub-frames of the first frame configuration,
determining a block error rate for the sub-frame; and
characterizing the sub-frame as being one of a conflicting sub-frame and a non-conflicting sub-frame based on the block error rate.

16. The method of claim 12, further comprising:
for each of the plurality of sub-frames of the first frame configuration,
determining a noise plus interference floor; and
characterizing the sub-frame as being one of a conflicting sub-frame and a non-conflicting sub-frame based on the noise plus interference floor.

17. The method of claim 12, further comprising:
receiving, via a transceiver, a wireless signal from a second wireless base station;
decoding a control channel of the wireless signal;
determining, from the control channel, a second frame configuration for the second wireless base station; and
comparing the second frame configuration to the first frame configuration to characterize the plurality of sub-frames into conflicting and non-conflicting sub-frames.

18. The method of claim 12, further comprising:
retrieving, from an electronic database, a second frame configuration for a second wireless base station operating in the vicinity of the first wireless base station; and
comparing the second frame configuration to the first frame configuration to characterize the plurality of sub-frames into conflicting and non-conflicting sub-frames.

19. The method of claim 12, further comprising:
measuring a receive interference power level for a time period, and during which time no subscribers are assigned during that time period; and
determining whether the subscriber unit is a resilient user or a non-resilient user based on the receive power interference level and a power headroom report from the subscriber unit.

20. The method of claim 12, further comprising:
responsive to determining that the subscriber unit is a resilient user, operating the subscriber unit using adaptive power control.

21. The method of claim 20, wherein operating the subscriber unit using adaptive power control includes increasing a power output of the subscriber unit sufficiently to overcome the interference.

22. The method of claim 12, further comprising:
for each of a plurality of radio frequency channels,
- for each of the plurality of sub-frames of the first frame configuration, characterizing, with the electronic processor, the sub-frame as being one of a conflicting sub-frame and a non-conflicting sub-frame; and
- selecting, with the electronic processor, from the plurality of radio frequency channels, an operating channel for the first wireless base station, the operating channel having the least amount of conflicted sub-frames of the plurality of radio frequency channels.

23. The method of claim 12, further comprising:
responsive to determining that the subscriber unit is a resilient user, electronically adapting a downtilt of an antenna of the first wireless base station during conflicting sub-frames.

\* \* \* \* \*